UNITED STATES PATENT OFFICE.

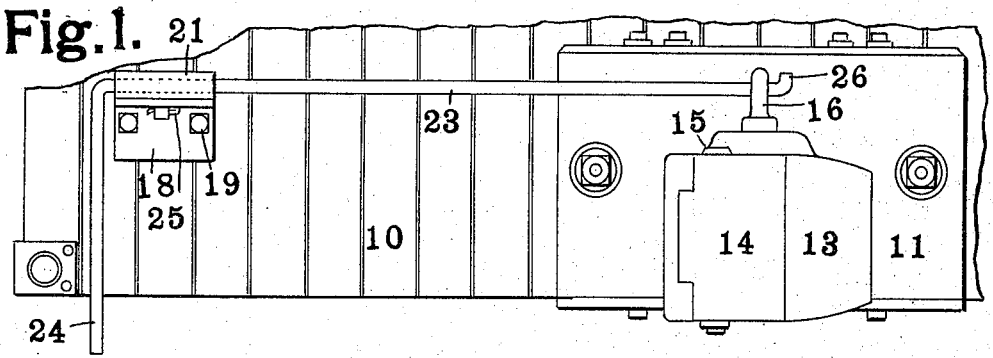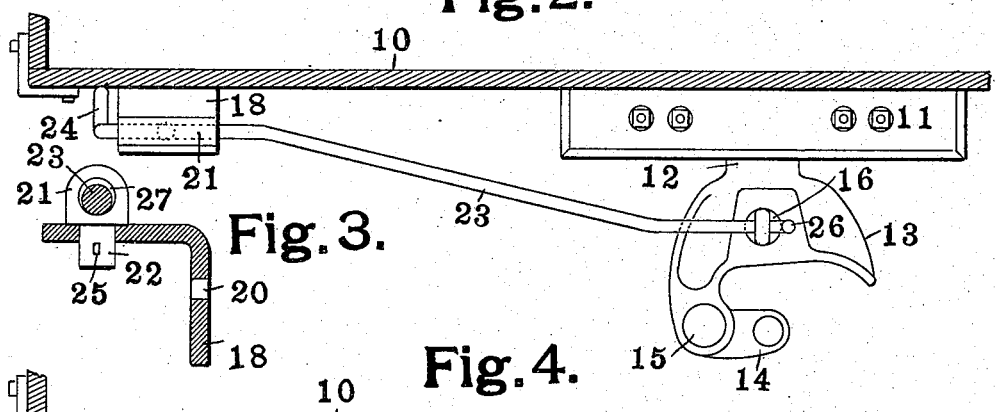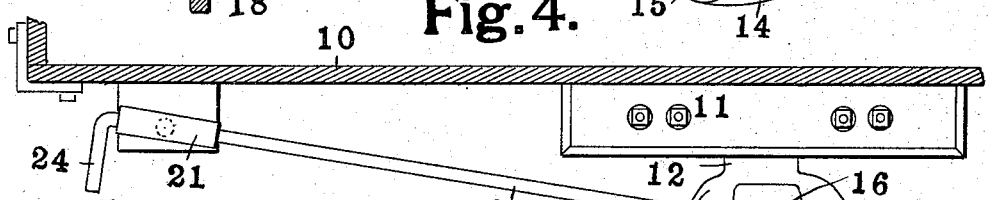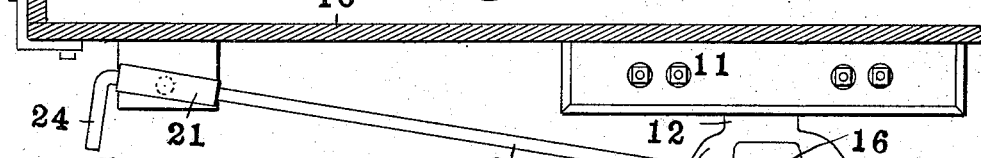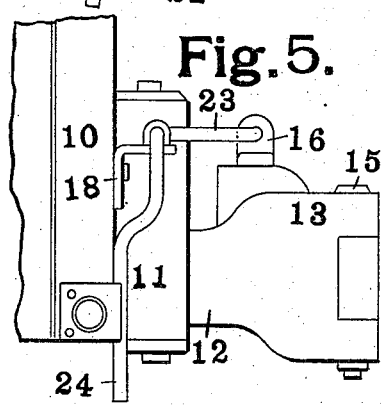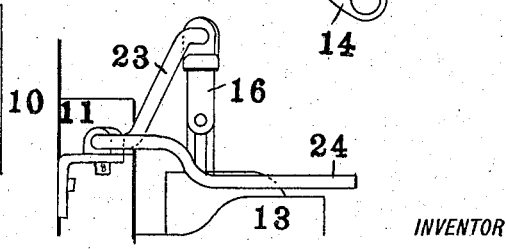

LOUIS A. HOERR, OF ST. LOUIS, MISSOURI.

RELEASING DEVICE FOR CAR-COUPLINGS.

1,167,069.   Specification of Letters Patent.   Patented Jan. 4, 1916.

Application filed February 3, 1915. Serial No. 5,837.

*To all whom it may concern:*

Be it known that I, LOUIS A. HOERR, a citizen of the United States of America, residing at the city of St. Louis, State of Missouri, have invented a certain new and useful Releasing Device for Car-Couplings, of which the following is such a full, clear, and exact description as will enable any one skilled in the art to which it appertains to make and use the same, reference being had to the accompanying drawings, forming part of this specification.

Releasing devices for car couplers heretofore in use have, so far as I am aware, all belonged to one of two classes. In the first of these classes, the releasing rod is arranged to rotate in suitable bearings on an axis fixed with relation to the end of the car. In this class of releasing devices, the bearings in which the rod turns form a fulcrum for raising the locking pin. Inasmuch, however, as the axis upon which the rod turns is fixed with relation to the end of the car, the rod cannot engage directly with the locking pin but is connected thereto by means of a chain or by some form of link mechanism so as to allow of the necessary relative movement between the drawhead and the end of the car. This construction not only increases the cost of the device, but it has been found, in practice, to be very likely to get out of order and render the device inoperative.

In the second form of releasing devices, above referred to, as, for example, shown in the patent to Walter P. Murphy, No. 1,018,948, issued December 1, 1914, the rod engages directly with the locking pin of the coupler. In this construction, the rod is arranged to turn in a bearing adjacent to the side of the car, which bearing is so arranged as to allow of lateral movement of the rod. This lateral movement of the rod is such that the bearing cannot form a fulcrum for raising the pin, consequently a sliding bearing must be arranged adjacent to the drawhead of the car to form the fulcrum. The use of this second bearing not only adds to the expense of the device, but its form and location is such as to render it very liable to be damaged by contact with the parts of another car.

The object of my invention is to provide a releasing device for car couplers in which the rod engages directly with the locking pin of the coupler and in which a single bearing is used, which is so arranged as to allow of the necessary movement of the rod in a horizontal plane to compensate for the movement of the drawhead and, at the same time, to form a fulcrum for raising the locking pin of the coupler.

In the accompanying drawings, which illustrate one form of releasing device made in accordance with my invention, together with so much of a railway car as is necessary to show its application, Figure 1 is an end elevation; Fig. 2 is a plan view; Fig. 3 is an enlarged sectional view of a detail; Fig. 4 is a view similar to Fig. 2, showing the parts in a different position; Fig. 5 is a side elevation; and Fig. 6 is a view of some of the parts shown in Fig. 5, but showing the parts in a different position.

Like marks of reference refer to similar parts in the several views of the drawings.

10 represents the body of a railway car carrying a striking block 11, through which projects the draw-bar 12 carrying the drawhead or coupler 13. This drawhead or coupler 13 is provided with the usual knuckle 14 pivoted to the drawhead at 15 and controlled by the locking pin 16. All of the above parts may be of any usual and well-known construction.

Secured to the body 10 of the car, adjacent to the side thereof, is a bracket 18 which may be secured in position by means of bolts 19 passing through openings 20 in the vertical web of said bracket.

21 is a bearing which is provided with a trunnion 22 passing through an opening in the horizontal web of the bracket 18 and forming the pivot upon which the bearing 21 may move in a horizontal plane. Passing through the bearing 21 is the operating rod 23 of the lifting device. This rod 23 has its end 24 bent at right angles to the body of the rod so as to form a handle for turning the rod in the bearing 21. The rod 23 extends through the eye of the locking pin 16 and has its end 26 turned over to prevent the disengagement of the rod from the pin. The rod 23 is preferably slightly smaller than the opening 27 in the bearing 21 so as to allow of a slight vertical movement between the rod and the bearing. This vertical movement will compensate for any vertical movement of the drawhead with relation to the car. It is not sufficient, however, to interfere with the function of the bearing as a fulcrum for raising the pin 16. The trunnion 22 is prevented from being disengaged from the bracket 18 by means of a cotter pin 25, or in any other suitable manner.

The operation of the device is as follows: The parts being in the position shown in Figs. 1, 2 and 5, when it is desired to release the coupler, the handle 24 is grasped and drawn upward into a substantially horizontal position. This rotates the rod 23 in the bearing 21 and, as only a limited movement is allowed between the bearing and the rod, the bearing forms a fulcrum by means of which the pin 16 is raised into the position shown in Fig. 6 of the drawings. The bearing 21 will, at the same time, turn upon its pivot 22 as shown in Fig. 4 of the drawings. This pivotal movement of the bearing 21 not only allows it to turn when the pin is raised, but, at the same time, when the pin is either in raised or lowered position, it allows the rod to move in a horizontal plane so as to compensate for the necessary movement between the drawhead and the body of the car.

It will be seen that while my device is of the simplest possible construction, it is very effective in operation and is not liable to get out of order.

Having fully described my invention, what I claim as new and desire to secure by Letters-Patent of the United States is:

In a releasing device for car couplers, the combination with a rod normally connected with the locking pin of the coupler, of a bearing in which said rod is pivoted, said bearing forming a fulcrum for lifting the pin by the rotation of the rod on its longitudinal axis, said bearing also permitting movement of the rod in a substantially horizontal plane to compensate for the relative movement of the coupler and the car, said rod being arranged to allow lateral movement of the coupler.

In testimony whereof, I have hereunto set my hand and affixed my seal in the presence of the two subscribing witnesses.

LOUIS A. HOERR. [L. S.]

Witnesses:
W. A. ALEXANDER,
G. M. SHORE.